United States Patent
Adjakple et al.

(10) Patent No.: US 11,503,495 B2
(45) Date of Patent: Nov. 15, 2022

(54) QUALITY OF SERVICE REALIZATION IN MULTI-HOP DATA FORWARDING

(71) Applicant: IPLA Holdings Inc., New York, NY (US)

(72) Inventors: Pascal M. Adjakple, Great Neck, NY (US); Stephen E. Terry, Northport, NY (US); Qing Li, Princeton Junction, NJ (US); Joseph M. Murray, Schwenksville, PA (US); Lakshmi R. Iyer, King of Prussia, PA (US); Guodong Zhang, Woodbury, NJ (US); Mohamed Awadin, Plymouth Meeting, PA (US); Yifan Li, Conshohocken, PA (US); Allan Y. Tsai, Boonton, NJ (US)

(73) Assignee: IPLA HOLDINGS INC., New York, NY (US)

(*) Notice: Subject to any disclaimer, the term of this patent is extended or adjusted under 35 U.S.C. 154(b) by 0 days.

(21) Appl. No.: 17/252,958

(22) PCT Filed: Jun. 20, 2019

(86) PCT No.: PCT/US2019/038216
§ 371 (c)(1),
(2) Date: Dec. 16, 2020

(87) PCT Pub. No.: WO2019/246382
PCT Pub. Date: Dec. 26, 2019

(65) Prior Publication Data
US 2021/0168645 A1 Jun. 3, 2021

Related U.S. Application Data

(60) Provisional application No. 62/753,554, filed on Oct. 31, 2018, provisional application No. 62/735,210, (Continued)

(51) Int. Cl.
*H04W 28/02* (2009.01)
*H04W 72/12* (2009.01)

(52) U.S. Cl.
CPC ... *H04W 28/0263* (2013.01); *H04W 28/0268* (2013.01); *H04W 72/1226* (2013.01)

(58) Field of Classification Search
CPC ..... H04L 45/123; H04L 45/302; H04L 47/28; H04W 28/0263; H04W 28/0268;
(Continued)

(56) References Cited

U.S. PATENT DOCUMENTS 9,722,743 B2 * 8/2017 Li .................. H04W 72/1221
9,775,141 B2 * 9/2017 Nimbalker ............ H04L 5/0053
(Continued)

FOREIGN PATENT DOCUMENTS

EP 1187384 A1 3/2002

OTHER PUBLICATIONS

Ericsson: "User Plane Latency in IAB Networks", GPP Draft; R2-1816576—User Plane Latency in IAB Networks, 3rd Generation Partnership Project (3GPP), Mobile Competence Centre ; 650, Route Des Lucioles ; F-06921 Sophia-Antipolis Cedex ; France, vol. RAN WG2, no. Spokane, USA; Nov. 12, 2018-Nov. 16, 2018 (Nov. 1, 2018), XP051480523, Retrieved from the Internet: URL:http://www.3gpp.org/ftp/tsg%5Fran/WG2%5FRL2/TSGR2%5F104/Docs/R2%2D1816576%2Ezip on Nov. 1, 2018.
(Continued)

*Primary Examiner* — Nathan S Taylor
(74) *Attorney, Agent, or Firm* — Xsensus LLP

(57) ABSTRACT

Logical Channel Prioritization (LCP) may be enhanced by accounting for Quality of Service (QoS) attributes of single hop and multi-hop paths. QoS attributes may be communicated as a QoS budget comprising a number of attributes, or as a single composite QoS "resistance" factor that quantifies
(Continued)

the compounded impact of number of hops, latency, load conditions, and the like. The QoS budget or resistance may dynamically adjusted, and may be used by LCP to provide differentiated uplink resource allocation to data of the bearer or logical channel subject to different transmission paths between the transmitter and the receiver, for example. QoS budget and resistance information may be used to, e.g., enhance Buffer Status Report (BSR) and Scheduling Request (SR) operations.

15 Claims, 10 Drawing Sheets

Related U.S. Application Data filed on Sep. 24, 2018, provisional application No. 62/687,478, filed on Jun. 20, 2018.

(58) Field of Classification Search
CPC ............ H04W 28/0278; H04W 40/12; H04W 72/1226; H04W 28/02; H04W 72/12; H04W 92/20

See application file for complete search history.

(56) References Cited

U.S. PATENT DOCUMENTS

| | | | | |
|---|---|---|---|---|
| 10,574,421 | B2* | 2/2020 | Nory | H04W 72/1284 |
| 11,140,695 | B1* | 10/2021 | Eyuboglu | H04L 5/1469 |
| 11,206,549 | B1* | 12/2021 | Eyuboglu | H04W 36/06 |
| 2013/0083677 | A1* | 4/2013 | Kim | H04W 72/1284 |
| | | | | 370/252 |
| 2013/0182624 | A1* | 7/2013 | Sun | H04W 52/0212 |
| | | | | 370/311 |
| 2014/0092865 | A1* | 4/2014 | Heo | H04B 5/00 |
| | | | | 370/331 |
| 2014/0269352 | A1* | 9/2014 | Sun | H04W 72/042 |
| | | | | 370/250 |
| 2015/0009874 | A1* | 1/2015 | Edara | H04W 72/1268 |
| | | | | 370/311 |
| 2015/0110040 | A1* | 4/2015 | Zhao | H04W 72/1252 |
| | | | | 370/328 |
| 2015/0181491 | A1* | 6/2015 | Van Phan | H04W 28/08 |
| | | | | 370/331 |
| 2015/0230082 | A1* | 8/2015 | Li | H04W 24/08 |
| | | | | 370/252 |
| 2016/0007240 | A1* | 1/2016 | Belghoul | H04W 36/14 |
| | | | | 370/331 |
| 2016/0073427 | A1* | 3/2016 | Worrall | H04W 72/1284 |
| | | | | 370/329 |
| 2016/0100397 | A1* | 4/2016 | Wen | H04W 72/0413 |
| | | | | 370/329 |
| 2017/0196016 | A1* | 7/2017 | Tabet | H04W 28/24 |
| 2017/0265216 | A1* | 9/2017 | Andreoli-Fang | |
| | | | | H04W 72/1252 |
| 2017/0332392 | A1* | 11/2017 | Miao | H04W 72/0446 |
| 2017/0339681 | A1* | 11/2017 | Hussain | H04L 5/0053 |
| 2017/0353819 | A1* | 12/2017 | Yin | H04W 72/1284 |
| 2018/0076942 | A1* | 3/2018 | Nory | H04L 1/1861 |
| 2018/0077651 | A1* | 3/2018 | Nory | H04W 52/146 |
| 2018/0077658 | A1* | 3/2018 | Nory | H04W 74/0833 |
| 2018/0077718 | A1* | 3/2018 | Nory | H04W 52/346 |
| 2018/0077721 | A1* | 3/2018 | Nory | H04L 5/0082 |
| 2018/0323939 | A1* | 11/2018 | Nory | H04L 1/1854 |
| 2018/0368173 | A1* | 12/2018 | Shaheen | H04W 72/1289 |
| 2019/0069253 | A9* | 2/2019 | Nory | H04W 74/0833 |
| 2019/0082484 | A1* | 3/2019 | Nory | H04W 76/14 |
| 2019/0124572 | A1* | 4/2019 | Park | H04W 36/0088 |
| 2019/0215856 | A9* | 7/2019 | Nory | H04W 72/1278 |
| 2019/0281641 | A1* | 9/2019 | Cheng | H04W 72/1289 |
| 2020/0187298 | A1* | 6/2020 | Chun | H04W 40/12 |
| 2020/0196312 | A1* | 6/2020 | Faurie | H04W 72/1205 |
| 2021/0144580 | A1* | 5/2021 | Alfarhan | H04W 80/02 |
| 2021/0266953 | A1* | 8/2021 | Pelletier | H04W 72/1289 |

OTHER PUBLICATIONS

Moussa et al., "Binary de Bruijn on-chip network for a flexible multiprocessor LDPC decoder", Design Automation Conference DAC; [Design Automation Conference: DAC; ISSN 0738-100X], Association for Computing Machinery Institute of Electrical and Electronics Engineers, US, (Jun. 8, 2008), pp. 429-434.

* cited by examiner

QUALITY OF SERVICE REALIZATION IN MULTI-HOP DATA FORWARDING

CROSS-REFERENCE TO RELATED APPLICATIONS

This application is the National Stage of International Patent Application No. PCT/US2019/038216, filed Jun. 20, 2019, which claims the benefit of three U.S. Provisional Applications: App. No. 62/687,478 filed Jun. 20, 2018; App. No. 62/735,210 filed Sep. 24, 2018; and App. No. 62/753,554 filed Oct. 31, 2018, all titled "Quality of service realization in multi-hop data forwarding," the content of which are hereby incorporated by reference in their entirety.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

In support of multi-hop backhauling in NR, hop-by-hop data forwarding architectures are being considered. An Integrated Access and Backhaul (IAB)-node is a Radio Access Network (RAN) node that supports wireless access to User Equipments (UEs) and wirelessly backhauls the access traffic. An IAB-donor is a RAN node which provides an interface to core network to UEs and wireless backhauling functionality to IAB nodes. The IAB architecture strives to reuse existing functions and interfaces defined for access. A Mobile-Termination (MT) function has been defined as a component of the mobile equipment. In the context of the IAB architecture, MT is referred to as a function residing on an IAB-node that terminates the radio interface layers of the backhaul Uu interface toward the IAB-donor or other IAB-nodes.

SUMMARY

Quality of Service (QoS) may be realized in single hop, and in multi-hop data forwarding, via a variety of techniques.

For example, enhancements to Logical Channel Prioritization (LCP) may be used mitigate impacts due to a data map to a logical channel following different paths between transmitter and receiver, and therefore having different latency, access load conditions, backhaul load conditions, and load conditions of intermediary nodes forwarding data.

A scalar parameter, herein denoted QoS resistance, may be used to quantify the compounded impact of, e.g., the number of hops, latency, load conditions, and the like. QoS resistance may be used to express actual or expected QoS performance of a path. QoS resistance may also be used to express a set of QoS requirements for a set of data, i.e., a QoS budget. QoS resistance may be used by LCP to provide differentiated uplink resource allocation to data of the bearer or logical channel subject to different transmission paths between the transmitter and the receiver. QoS resistance may be adjusted dynamically adjust data packet QoS requirements and/or bearers' ability to fulfil target QoS along the path between source transmitter node and final destination node.

Buffer Status Report (BSR) generation may be enhanced through the use of a QoS resistance parameter. Further BSR operations may be improved by allowing transmission of a BSR before corresponding data becomes available.

Data link architectures may be enhanced for QoS differentiation, e.g., by taking into account QoS resistance attributes.

Route selection and reselection may enhanced by the transmission of QoS resistance, through the use of route selection triggers for various scenarios, and/or by using network assistance information provided to help a UE perform route selection.

Scheduling Request (SR) operations may be enhanced, e.g., by taking into account the QoS resistance parameters. Further, an SR may be transmitted SR before corresponding data or a BSR becomes available.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings.

DETAILED DESCRIPTION OF ILLUSTRATIVE EMBODIMENTS

Figure 1A:
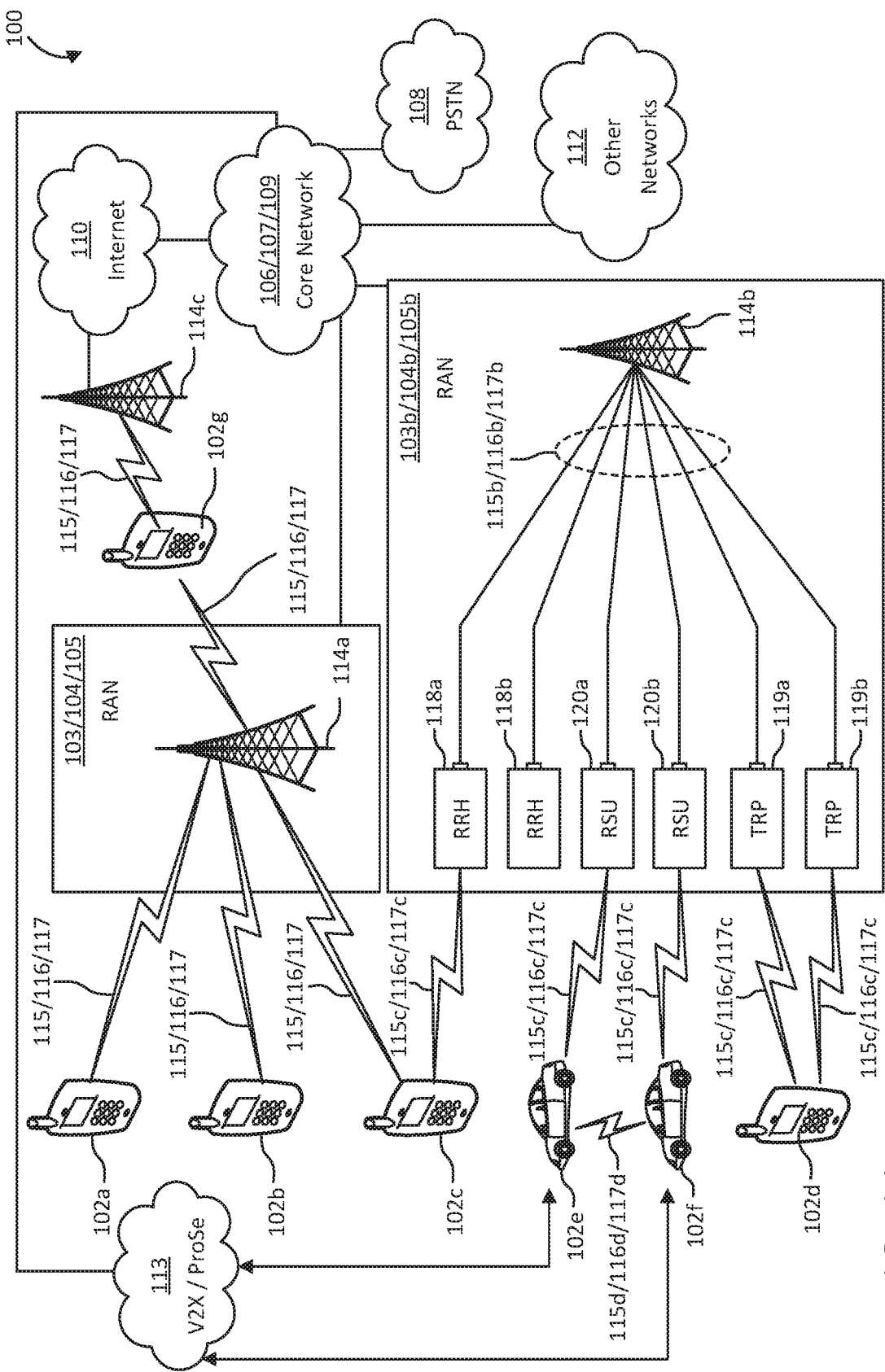
FIG. 1A illustrates an example communications system.

The following is a list of acronyms that may appear in the following description. Unless otherwise specified, the acronyms used herein refer to the corresponding terms listed below:

5GC 5G Core Network
5QI 5G QoS Identifier
AMBR Aggregate Maximum Bit Rate
AMC Adaptive Modulation and Coding
Adapt Adaption Layer BSR Buffer Status Report
BWP BandWidth Part
CN Core Network
CU Central Unit
CU-CP Central Unit Control Plane
CU-UP Central Unit User Plane
DRB Data Radio Bearer
DU Distributed Unit
eMBB Evolved or Enhanced Mobile Broadband
F1 F1 interface
F1AP F1 interface Application
gNB Node providing NR user plane and control plane protocol terminations towards the UE, and connected via the NG interface to the 5GC
IAB Integrated Access and Backhaul
IP Internet Protocol
L1 Layer 1
L2 Layer 2
LCP Logical Channel Prioritization
MAC Medium Access Control
mMTC massive Machine Type Communication
MT Mobile Termination
N1 N1 reference point
N3 N3 reference point
NAS Non-Access Stratum
NG Next Generation or NG interface between 5G-C and RAN
NGAP NG Interface Application
NG-AP NG Interface Application
NG-C NG Control Plane interface
NG Interface Interface between NG RAN and 5GC
NG-RAN NG RAN
NG-U NG User Plane Interface
NR NR Radio Access
PDCP Packet Data Convergence Protocol
PHY Physical Layer
QoS Quality of Service
RAN Radio Access Network
RB Radio Bearer
RLC Radio Link Control
RRC Radio Resource Control
SCG Secondary Cell Group
SDAP Service Data Adaption Layer
SRB Signalling Radio Bearer
SR Scheduling Request
STCP Stream Control Transmission Protocol
UE User Equipment
Un Un interface
URLLC Ultra-Reliable and Low Latency Communication
Uu Uu interface As used herein, unless otherwise specified, the term UE and the term MT side of IAB are used interchangeably. Also, the terms IAB-donor, gNB, or ng-eNB are used interchangeably unless otherwise specified.

Herein the terms "QoS budget" and "QoS resistance" are often used interchangeably. Both may refer to the QoS requirements of a data flow. A QoS budget may include different factors, such as latency, packet loss rates, etc. A QoS resistance may be a single expression that encapsulates or is derived from multiple factors of an associated the QoS budget. A QoS resistance may be expressed, for example, as a single number or value, whereas a QoS budget may have many attributes. The term "QoS resistance" may also be used in reference to the QoS performance of a pathway.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102*d*, 102*e*, 102*f*, 102*g* is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, and 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a*, 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a*, 120*b*, may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a*, and 120*b* over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPS 119*a*, 119*b*, and/or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPS 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
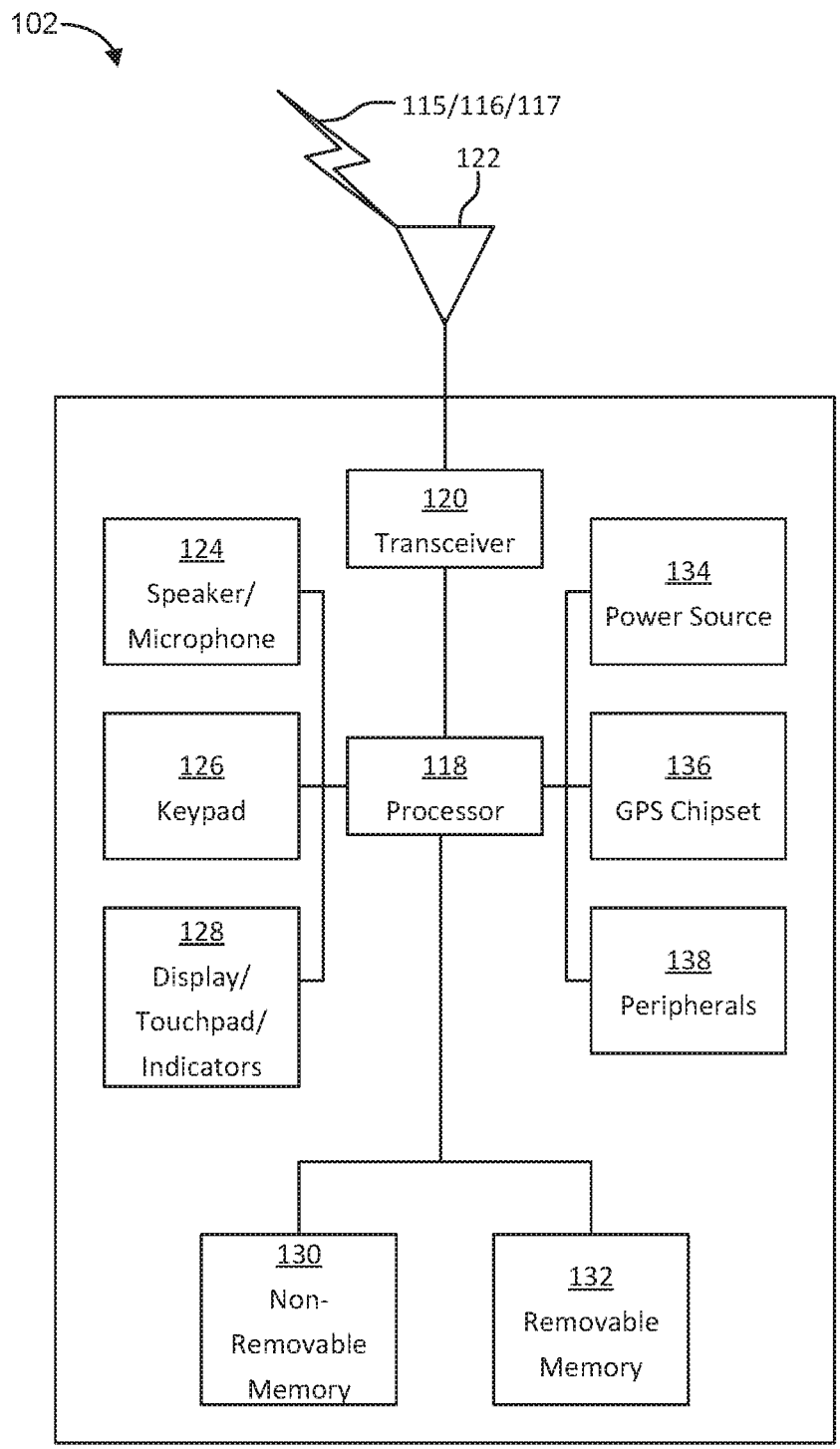
FIG. 1B is a block diagram of an example apparatus configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
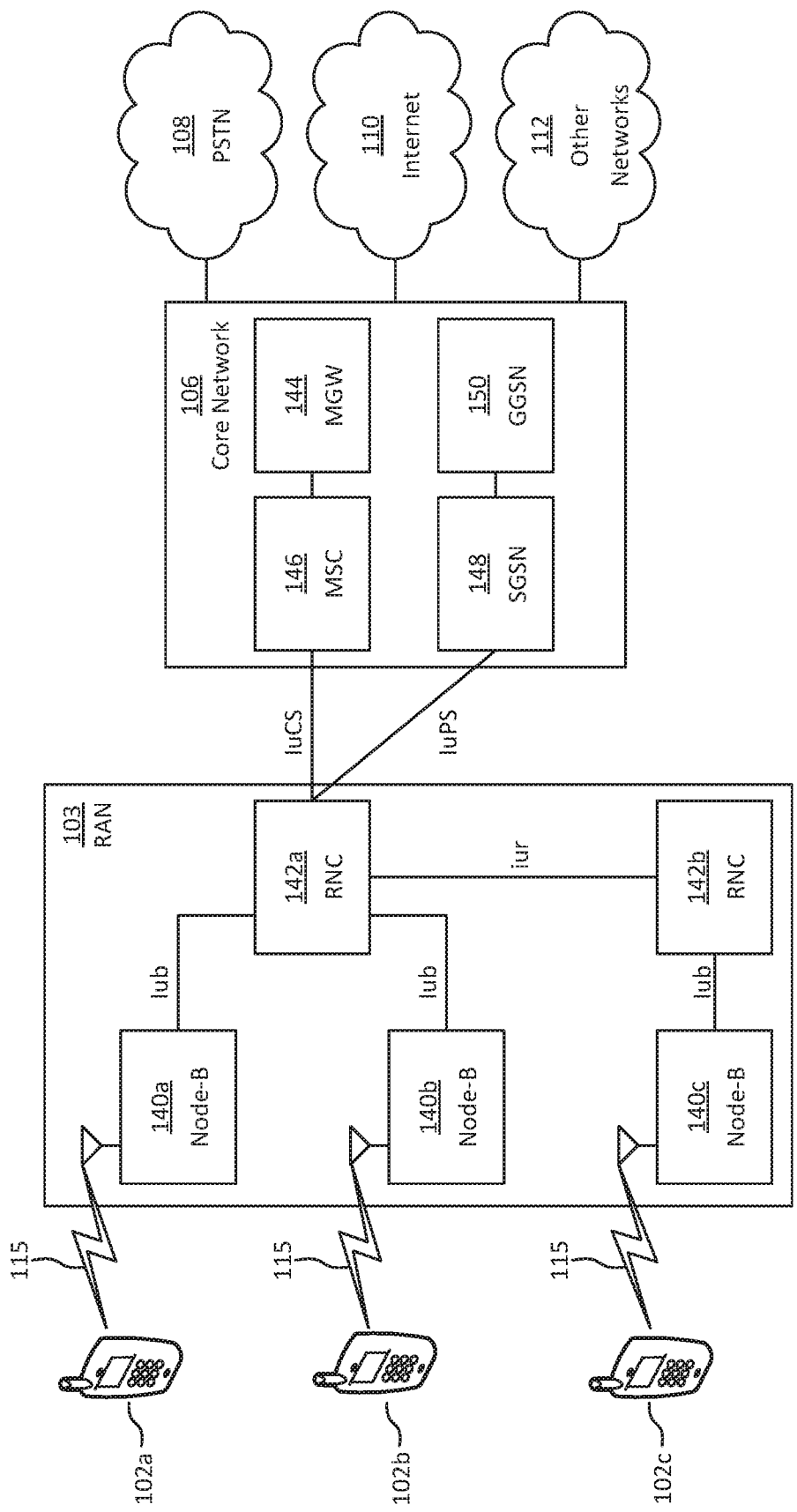
FIG. 1C is an example system diagram of the RAN 103 and the core network 106 of FIG. 1A.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
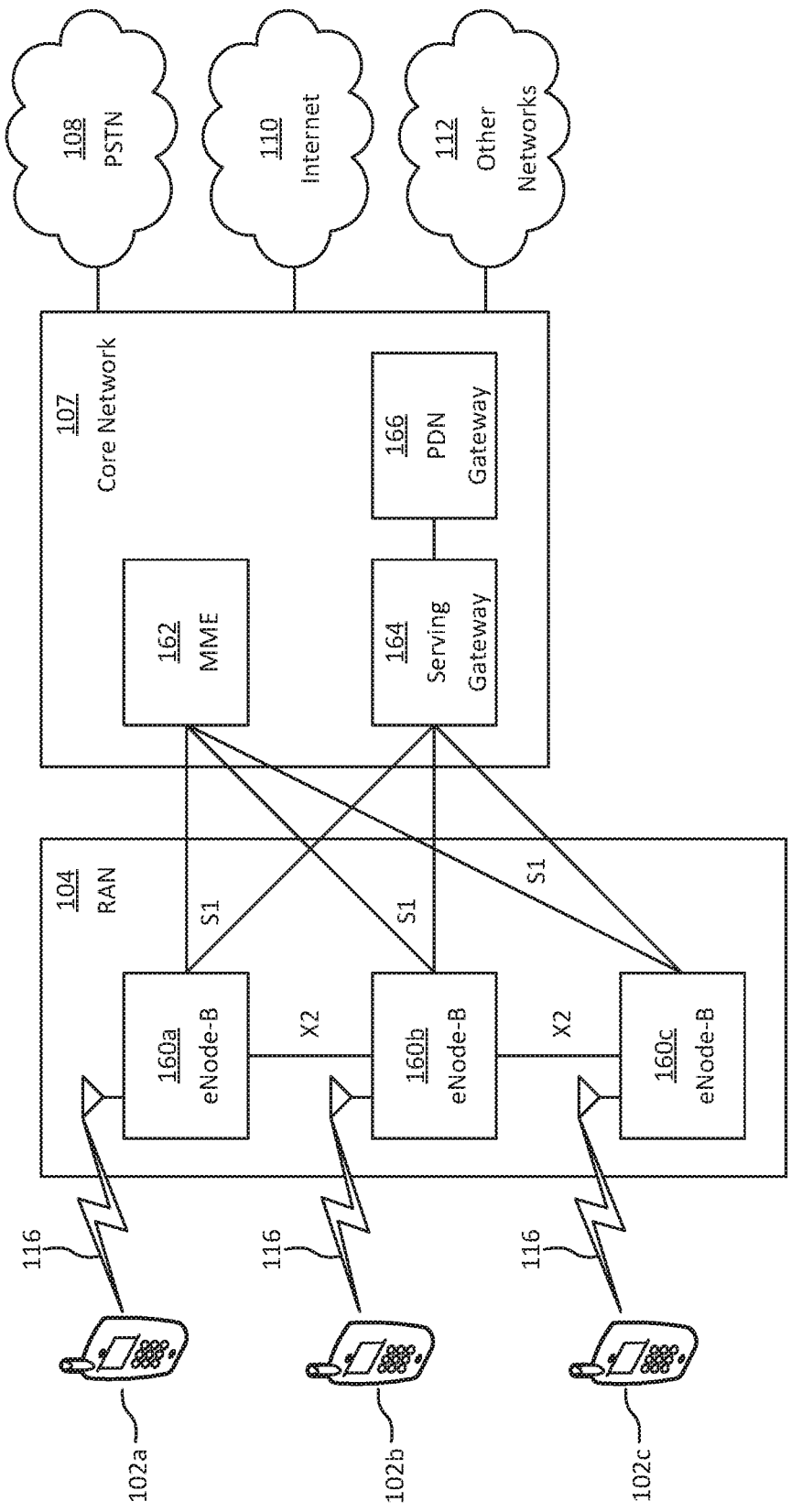
FIG. 1D is an example system diagram of the RAN 104 and the core network 107 of FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c, and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
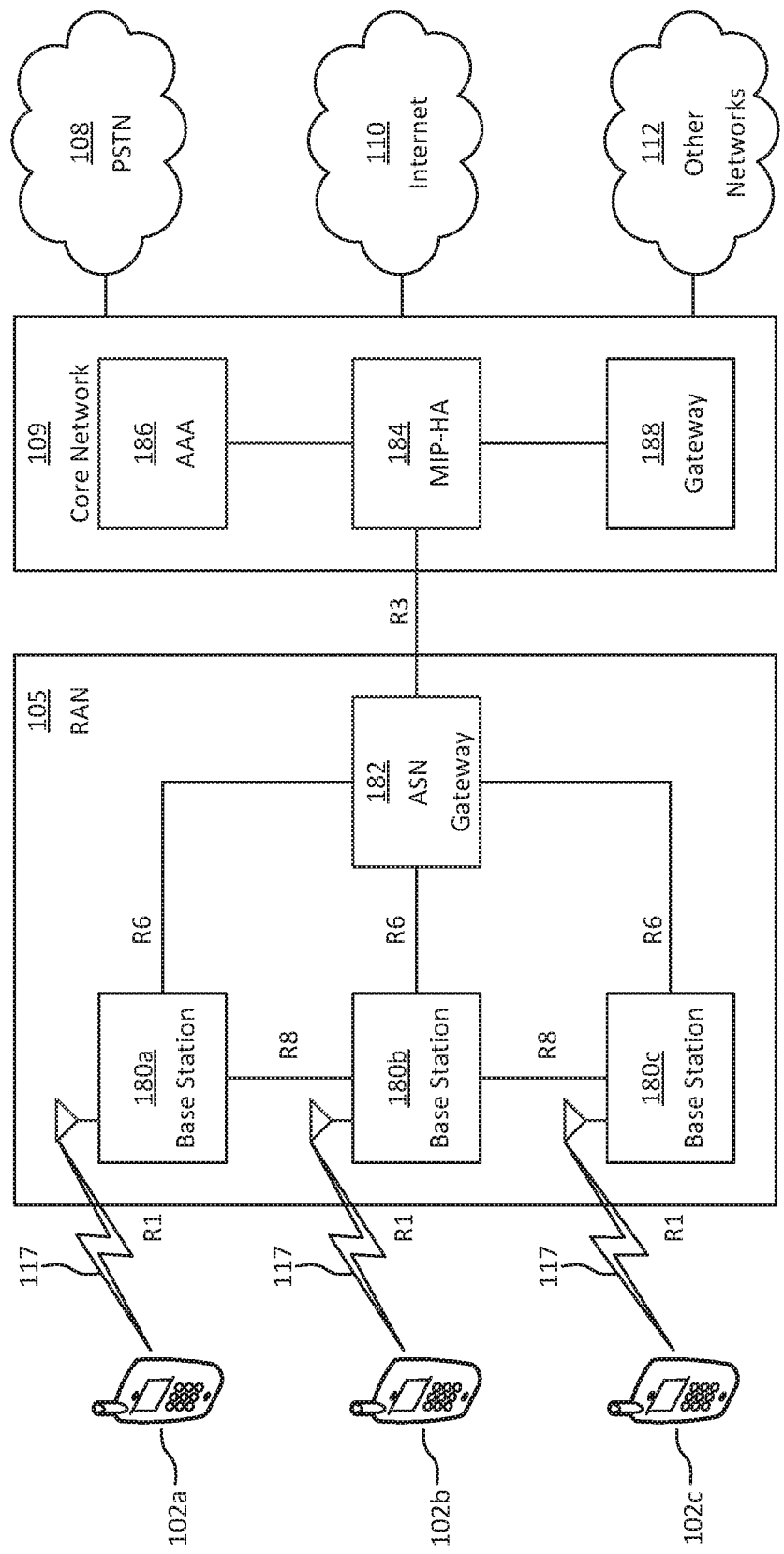
FIG. 1E is an example system diagram of the RAN 105 and the core network 109 of FIG. 1A according to an embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c, and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c, and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
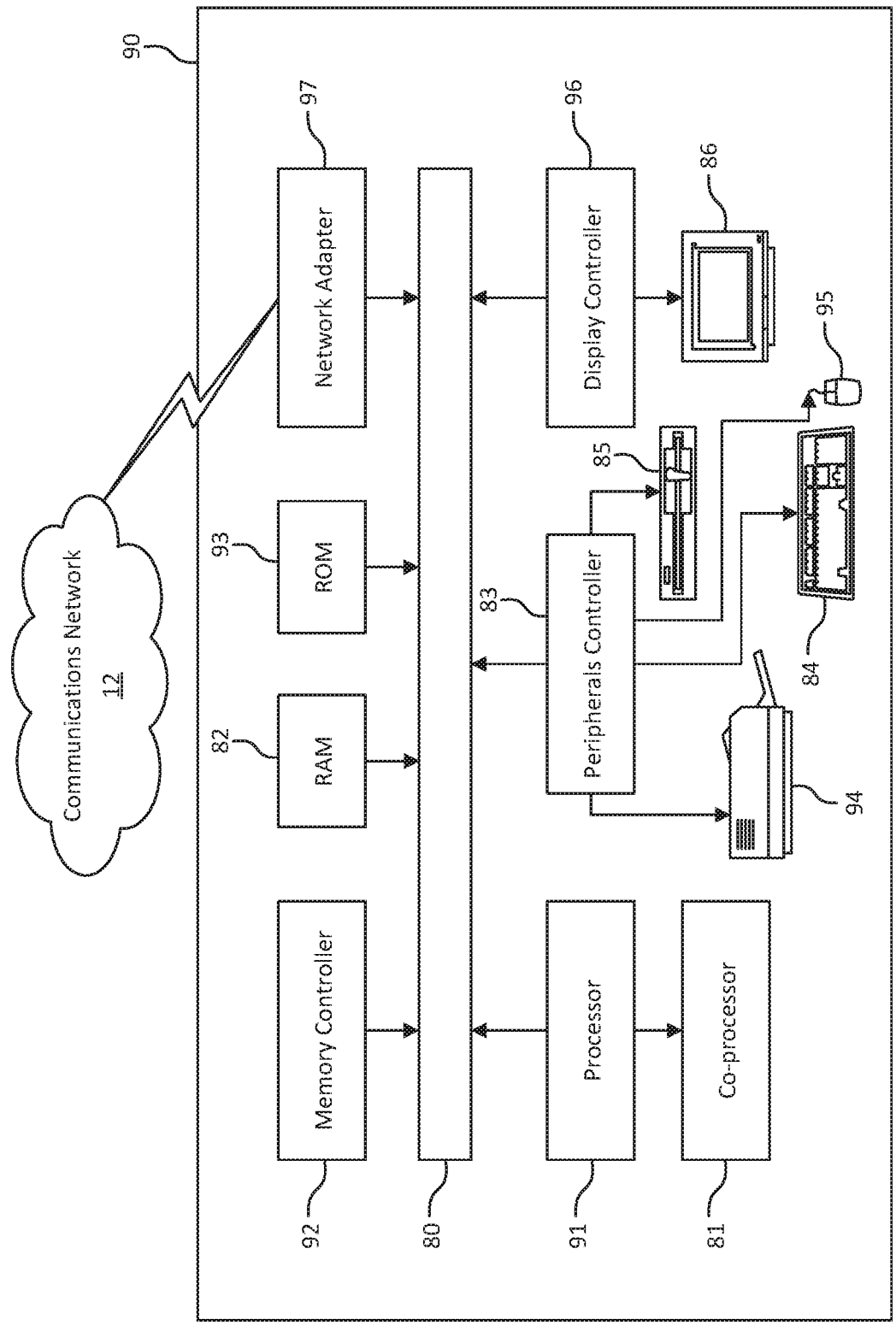
FIG. 1F is a block diagram of an exemplary computing system in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
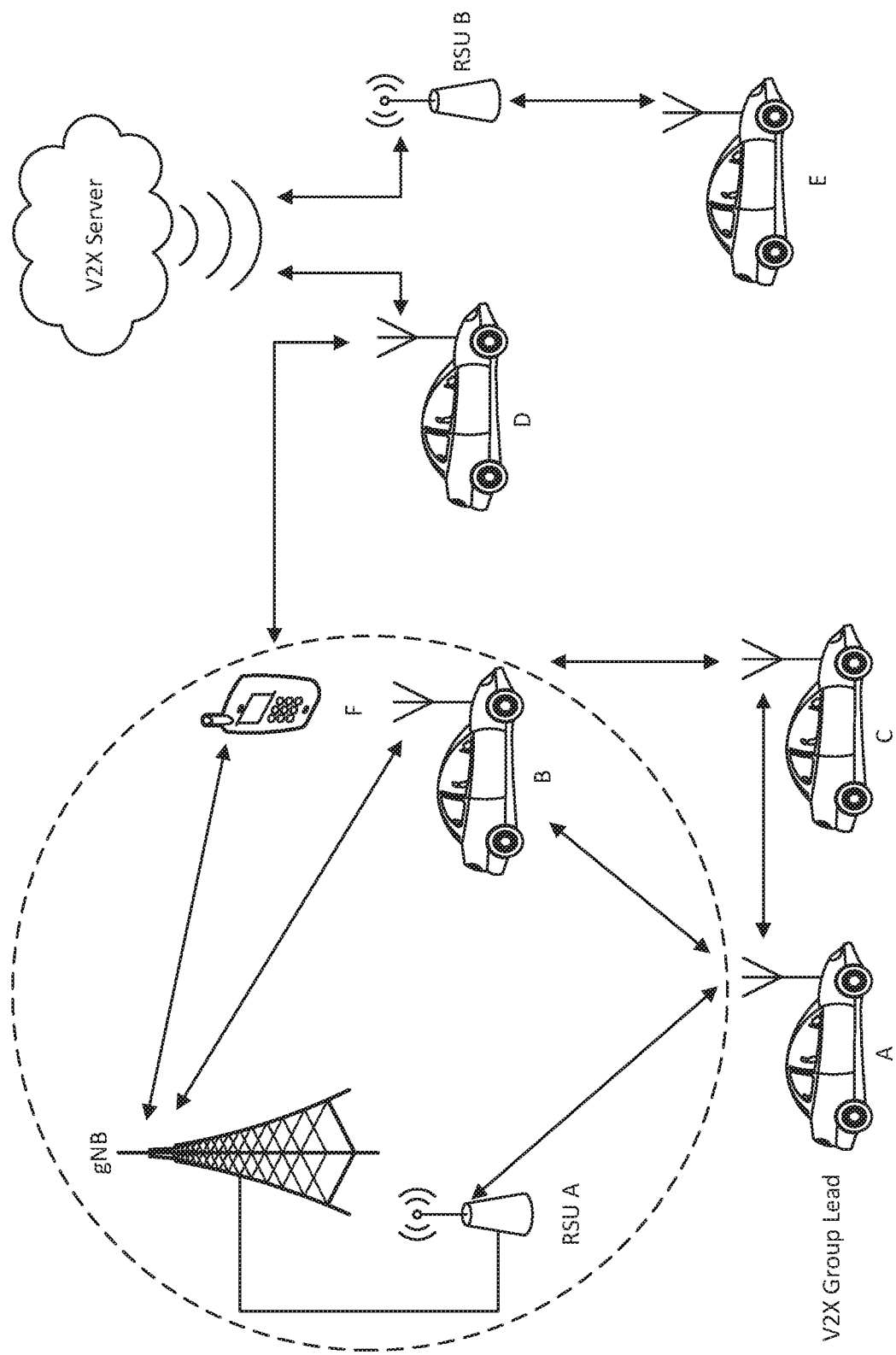
FIG. 1G shows an example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, and F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Example Challenges

Figure 2:
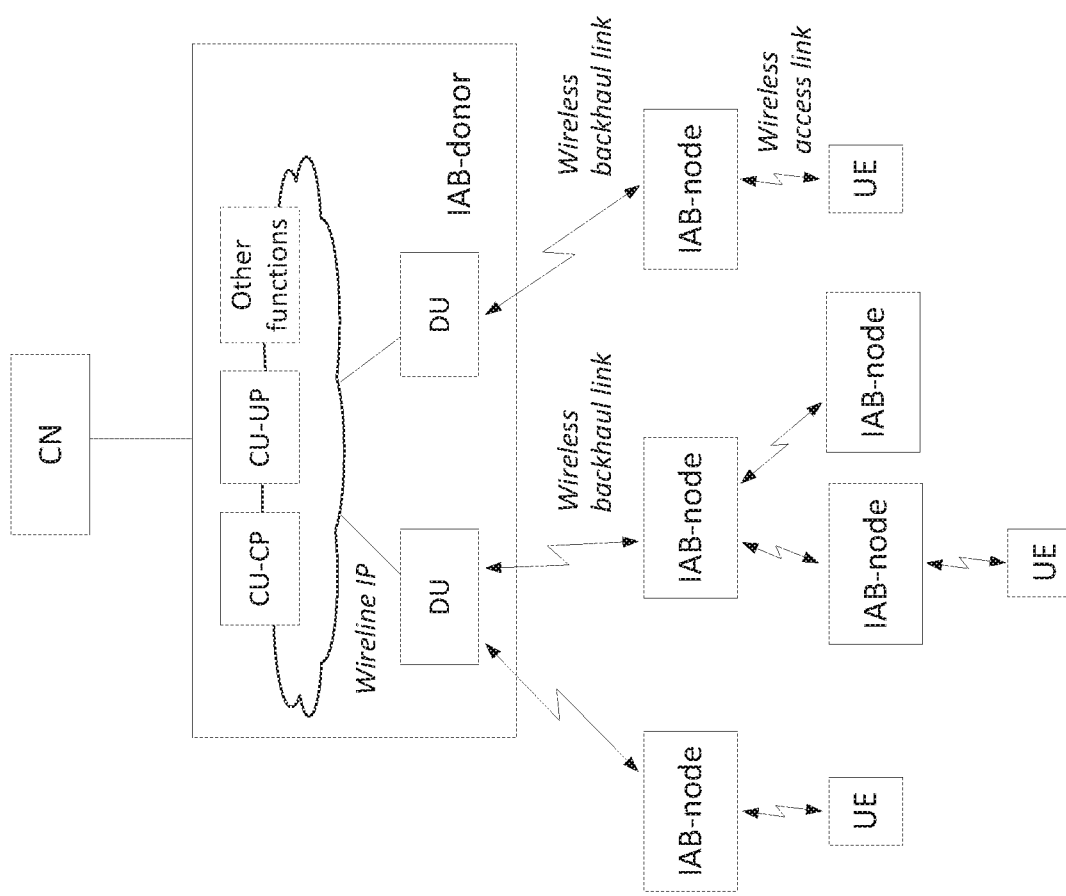
FIG. 2 shows a reference diagram for Integrated Access and Backhaul (IAB) architectures.
Figure 3:
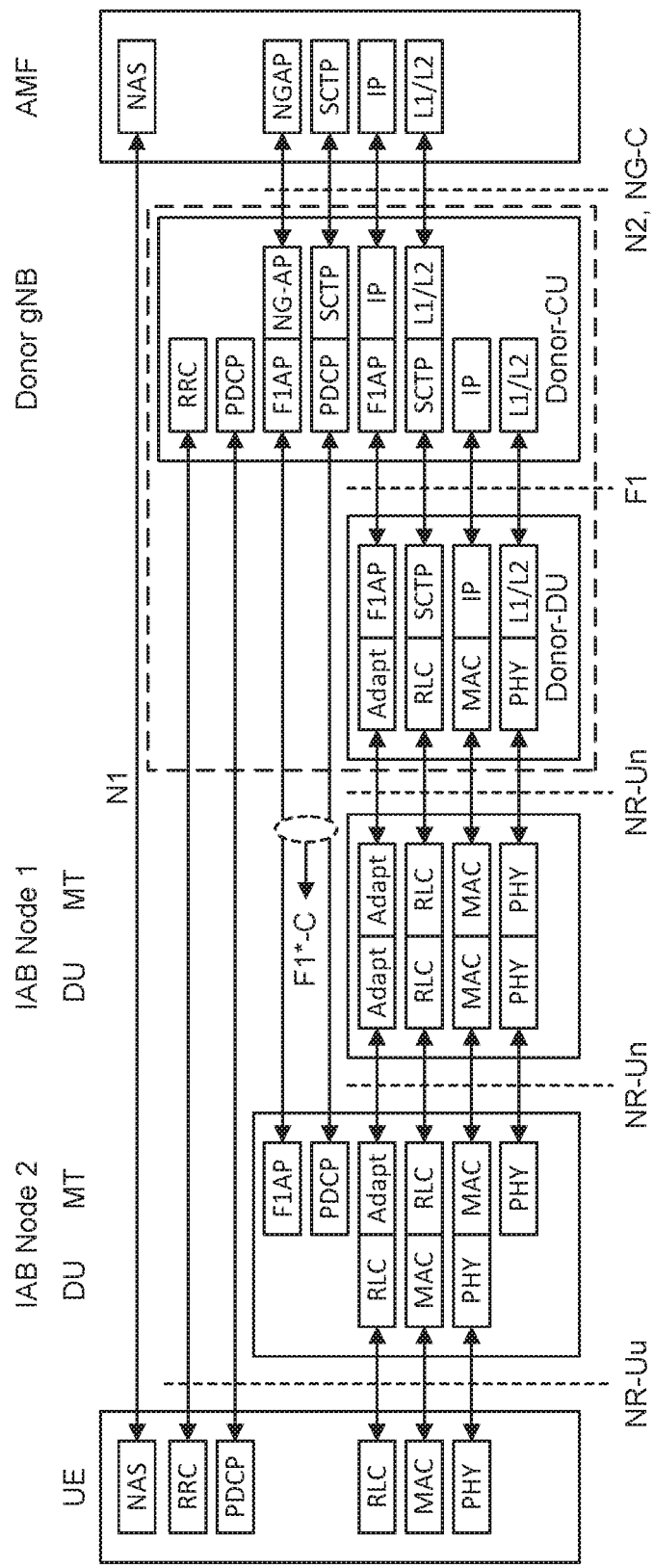
FIG. 3 shows an example of a control plane protocol stack for Layer 2 (L2) relaying.
Figure 4:
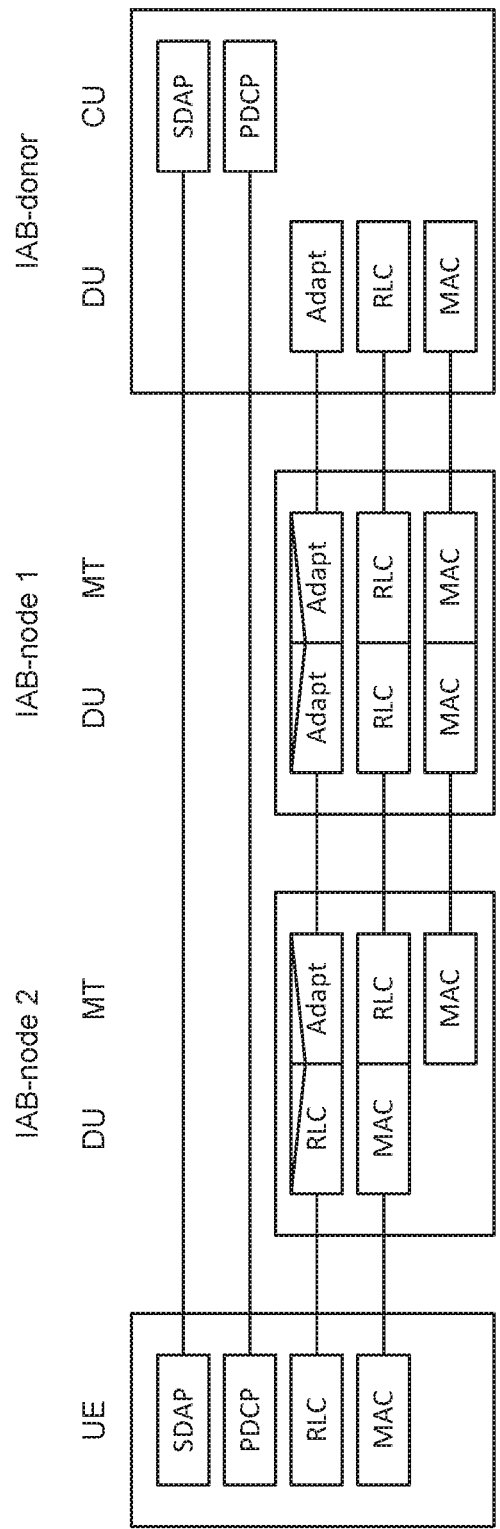
FIG. 4 shows an example of a user plane protocol stack for L2 relaying.

The hop-by-hop data forwarding architectures illustrated in FIGS. 2-4 may be used in support of multi-hop backhauling in NR. In FIGS. 2-4, the IAB-node is a RAN node that supports wireless access to UEs and wirelessly backhauls the access traffic. The IAB-donor is a RAN node which provides a UE's interface to core network and wireless backhauling functionality to IAB nodes. The IAB architecture strives to reuse existing functions and interfaces defined for access. The Mobile-Termination (MT) function has been defined as a component of the Mobile Equipment. In the context of IAB architecture, MT (see, for example, FIG. 4) is referred to as a function residing on an IAB-node that terminates the radio interface layers of the backhaul Uu interface toward the IAB-donor or other IAB-nodes.

One problem that needs to be addressed in the context of hop-by-hop RLC data forwarding, with no end-to-end peer RLC entities between the UE and the IAB donor node, is the problem of QoS realization taking into account not only the traditional QoS parameters modelled into SRBs/DRBs, but also taking into account the number of hops associated with a specific data flow or SDAP SDU. Different hops have different throughput. Even if data of same QoS are mapped to QoS specific radio bearer and RLC instances, the effect of varying channel conditions through different hops on the path of the data transmission from the IAB donor node to the UE, cannot be avoided. One result is that at particular IAB nodes, there could be significant data buffering which would remain unseen to the end points, leading to extra latencies, unnecessary retransmission, and inability to fulfil the end-to-end QoS requirements—particularly for services with guaranteed QoS requirements. Efficient solutions for data forwarding and scheduling solutions to meet end-to-end QoS requirements in multi-hop data transmission systems are needed.

Further, there is a need for selecting a route exchange between the UE and the IAB donor that is adequate for QoS requirements.

Enhanced LCP-Based Solution for QoS Realization

Logical Channel Prioritization (LCP) may be enhanced to take into account one or more of the following attributes that may characterize a path between the UE and the IAB donor node or the gNB: number of hops, uplink speed, uplink load, latency, and error rate.

The uplink speed may be, for example, the data rate of the path between the UE and the IAB donor node or the gNB. The speed may be an estimate of the data rate, in kilobits per second, on the data path between the UE and the IAB donor node or the gNB, e.g., the minimum speed of the hops on the path.

The uplink load may be, for example, for the path between the UE and the IAB donor node or the gNB, where the load may represent an estimate of the current percentage loading of the data path. This may be defined relative to the hop with the minimum speed, e.g., the load of the hop with the minimum speed among all hops of the path.

The latency may be, for example, for the data path between the UE and the IAB donor node or the gNB. The latency may be an estimate of the overall uplink latency over the data path, for example, taking into account the hop by hop latency for each hop along the data path between the UE and the IAB node or the gNB.

The error rate may be, for example, an estimation of the block error rate experienced on the path.

These attributes, or a subset thereof, may be combined in a composite metric, e.g., a single scalar parameter derived from a combination of the latency, the load, the speed, and the number of hops. Such a parameter may be called a QoS resistance. A QoS resistance may be determined between a transmitter performing the scheduled data transmission and the final destination receiver for the transmitted data, for example. The transmitter may be a UE or an IAB node in the case of uplink transmission, while for downlink transmission, the transmitter may be an IAB donor node, or IAB node. Similarly, the receiver may be an IAB node, an IAB donor for uplink transmission while for downlink transmission, the receiver may be the UE or an IAB node. The weighing factor of each attribute contribution to QoS resistance determination may be different depending on the service (e.g., eMBB versus URLLC versus mMTC) and the associated QoS requirements. A QoS resistance may be a numerical value, e.g., the lower the value, the higher the QoS resistance. Alternatively, the QoS resistance may be defined such that the higher the numerical value of the QoS resistance, the higher the QoS resistance. For purposes of illustration only, for the remainder of this description, it is assumed the lower the value of QoS resistance, the higher the QoS resistance. RRC may configure the UE or IAB nodes with the QoS resistance values of the data flows that can be mapped to each logical channel. Such configuration may be per logical channel and may include one or more resistance values, where data flows traveling the same path are associated with the same resistance value. RRC may configure for each data flow mapped to a logical channel, one or more allowed resistance values. Within the logical channel configuration structure, a list of data flows may be defined, where each data flow is configured with one or more allowed resistance values. Alternatively, NAS may configure a UE with one or more allowed resistance values for each data flow. The mapping of data flow to DRB and to logical channel, for example during bearer establishment or modification, may take into account an allowed QoS Resistance of the data flow, in addition to QoS Flow. QoS resistance may also be defined in term of resistance levels or scales such as low, medium, and high.

RRC may configure the UE with, QoS resistance on a QoS Flow basis, for example. RRC may configure the UE or IAB nodes with the QoS resistance values of QoS flows that can be mapped to each radio bearer and therefore to each logical channel. Such configurations may be per radio bearer or per logical channel and may include one or more resistance values, where QoS flows for data traveling the same path are associated with the same resistance value. RRC may configure one or more allowed resistance values for each QoS flow mapped to a logical channel. Within the radio bearer configuration structure or logical channel configuration structure, a list of QoS flows may be defined, where each QoS flow is configured with one or more allowed resistance values.

Enhancements to QoS realization in packet forwarding may address both QoS requirement of data to be transported from a transmitter to a destination and the ability of the bearers between the transmitter and the destination to provide packet forwarding treatment that meets target QoS. In typical networks, including cellular networks with one hop between the transmitter and the destination, these attributes above are well known within certain bounds at the transmitter. For example, in legacy one hop transmission-based cellular networks, a QoS requirement of a traffic admitted by the NB is usually well known to both the UE and the NB. Similarly, the ability of the bearers between the transmitter and the destination to provide packet forwarding treatment that meets target QoS, is also well known to the UE and the NB, although the later might be somewhat more dynamic because of the variation in radio conditions. Even then, because radio measurements are collected and taken into account in scheduling decision, a scheduler in the NB or the UE, may know the abilities of the bearers between the transmitter and the destination to provide packet forwarding treatment that meets target QoS, e.g., where such information is provided via configuration into the UE by NB of data packets QoS requirements mapping to bearers and logical channels.

In multi-hop networks, attributes such as QoS requirements and bearer abilities may be much more dynamic because of the multi-hop nature of the data path between the transmitter and the receiver. LCP may be enhanced by addressing these challenges. The solutions provided herein for addressing challenges in multi-hop architectures may also be applied in single-hop systems, e.g., to address variability in QoS requirements and bearer abilities and conditions. Similarly, the techniques expressed herein may be used to set to static values for QoS requirements and/or the packet forwarding ability of the bearers along the data path between the transmitter and the receiver. Furthermore, in the solutions described herein, the QoS requirements of a data packet at the source transmitters and the intermediary IAB node transmitters may be expressed as an available QoS budget, and such a budget may be compactly expressed as a QoS resistance. The packet forwarding ability of a bearer or other path may be modelled through proper mapping of data to routes and to radio bearers and/or logical channels and/or IAB nodes RLC back channels based on configuration or estimation of the QoS budget (e.g., QoS resistance) along the remaining path to the destination.

LCP Enhancements in Terms of Data Flow Mapping to Logical Channel in the Access Stratum Certain LCP enhancements may be described in terms of data flow mapping to logical channel in the access stratum.

In terms of the data link architecture, more than one data flow of the same QoS (i.e., a QoS Flow) may be mapped to the same Data Radio Bearer (DRB) and therefore to the same logical channel. Alternatively, more than one QoS flow may be mapped to the DRB and therefore to the same logical channel. Furthermore, the radio bearers of the same QoS from UEs served by a given IAB node may be aggregated and mapped to an IAB node bearer of the same QoS. Each of the UEs served by an IAB node may be connected to the IAB-donor through different paths with the same or different QoS resistance, where each path is made of a different number of hops. Furthermore, each UE may have multi-connectivity paths with the same or different QoS resistance toward the IAB-donor. Therefore, the data flows, or the QoS flows mapped to the same logical channel may be routed through data paths with different QoS resistance as defined above. Therefore, for UL grant resource allocation, the LCP may provide a differentiated treatment to the data flows with the same QoS requirement, or to the data of same QoS flows, but mapped to data paths with different QoS resistance. QoS Flow is used herein, as defined in 3GPP TS 23.501 V15.2.0, System Architecture for the 5G System, is the finest granularity of QoS differentiation in a PDU Session. Data flow is used herein in reference to service data flow as defined in 3GPP TS 23.501 V15.2.0, System Architecture for the 5G System, characterized by a service data flow filter, e.g., a set of packet flow header parameter values/ranges used to identify one or more of the packet (IP or Ethernet) flows constituting a Service Data Flow, and a service data flow template, which is the set of Service Data Flow filters in a policy rule or an application identifier in a policy rule referring to an application detection filter, required for defining a Service Data Flow.

Each logical channel may be configured with a several data buffers, where data flows with the same QoS resistance, or data with the same QoS flow and same QoS resistance within the logical channel, are assigned to the same data buffer, while data flows with different QoS resistance within the same logical channel, or data with same QoS flow but different QoS resistance within the same logical channel, may be assigned to different data buffers. QoS resistance is used to prioritize data flows or QoS flows within the same logical channel. Data flows or QoS flows within a logical channel are allocated grant in decreasing order of the QoS resistance of the corresponding data path.

Each logical channel may be configured with multiple prioritized bit rates, where different data packets or data flows or QoS flows mapped to the same logical channel but associated with data paths of different QoS resistance are mapped to different prioritized bit rate.

Each logical channel may be configured with multiple sets of logical channel mapping restrictions, where different data packets or data flows or QoS flows mapped to the same logical channel but associated with data paths of different QoS resistance are mapped to a different logical channel mapping restriction set. A set of logical channel mapping restrictions may include one or more of the following:

allowedSCS-List which sets the allowed Subcarrier Spacing(s) for transmission;

maxPUSCH-Duration which sets the maximum PUSCH duration allowed for transmission;

configuredGrantTypeIAllowed which sets whether a Configured Grant Type 1 can be used for transmission;

allowedServingCells which sets the allowed cell(s) for transmission. This restriction may be used to set data path allowed differently for data flows mapped to the same logical channel but associated with data paths of different QoS resistance.

configuredGrantType2llowed which sets whether a Configured Grant Type 2 can be used for transmission;

parameter K2 that is the time from UL grant reception to the beginning of UL transmission using the received grant. Small K2 values may be mapped to higher QoS resistance (lower QoS resistance numerical value) data path to give data flows traveling higher QoS resistance path, a head start for example when higher QoS resistance path implies longer latency on the path.

While the LCP enhancements described here, are described relative to the UE as being the transmitter, the proposed enhancements equally apply to an IAB node acting as transmitter of uplink data. Therefore, UE and uplink transmitter IAB node are same for the perspective of LCP procedure enhancements described herein.

Allowed QoS Resistance Budget Determination at Intermediary IAB Nodes

The allowed QoS resistance budget may be updated at each intermediary IAB node, as the data travelled through the many hops on the route between the source transmitter (e.g., UE for uplink traffic and IAB-donor for downlink traffic) and the final destination (IAB-donor for uplink traffic and UE for downlink traffic). To this end, and to allow an upstream receiver IAB node in the case of uplink traffic or to allow a downstream receiver IAB node in the case of downlink traffic, to determine the remaining allowed QoS resistance budget, the transmitter includes in each layer 2 (L2) PDU header, the allowed QoS resistance budget used to perform LCP procedure at the transmitter. The transmitter may also include, in each L2 PDU, the timestamp pertaining to the transmission time of the packet. The transmission time timestamp may be interpreted as a proxy to the QoS resistance or jointly used with the QoS resistance to decide packet forwarding prioritization for subsequent transmission along the transmission path to the destination. In one embodiment, the L2 Protocol may be the MAC protocol. The L2 Protocol may be designed such that the L2 PDU carries the allowed QoS resistance budget following one or more of the following combinations:

on a per logical channel basis, or on a per IAB backhaul RLC channel basis, or on a per transmitter basis, where the transmitter may be the UE in the case of uplink traffic, or may be the IAB-donor in the case of downlink traffic, or may be the IAB node in the case of either uplink or downlink traffic.

The transmitter node, e.g., an intermediary transmitter IAB node, at the transmission of an L2 SDU may use one or more of the parameters to determine the allowed remaining QoS resistance budget to be used in the LCP procedure. Such parameters may be one or more of the following:

a) A QoS or budget resistance associated with the L2 SDU when received from the preceding transmitter, e.g., in the case of uplink traffic, the immediate next hop downstream transmitter relative to this intermediary IAB node, and in the case of downlink traffic, the immediate next hop upstream transmitter;

b) A QoS budget or resistance associated with the hop between this intermediary IAB node and the preceding transmitter, e.g., in the case of uplink traffic, the immediate next hop downstream transmitter relative to this intermediary IAB node, and in the case of downlink traffic, the immediate next hop upstream transmitter;

RRC may configure into an IAB node, the QoS Resistance associated with a hop.

c) A timestamp associated with the L2 SDU when received from the preceding transmitter.

For uplink traffic a UE may determine, for each of the data buffers associated with a logical channel, the QoS resistance associated with a data buffer that will be used in LCP procedures. Each intermediary IAB node along the route travelled by the data between the UE and the IAB-donor then determines the QoS resistance to be used in LCP procedure by, e.g., subtracting from the QoS resistance used by LCP in the previous transmitter in the transmission chain the QoS resistance allocation to one hop, e.g., the hop between this intermediary IAB node and the preceding transmitter. Similarly, for downlink traffic, the IAB-donor may determine for each of the data buffers associated with a logical channel, the QoS resistance associated with a data buffer that will be used in LCP procedure. Each intermediary IAB node along the route travelled by the data between the IAB-donor and the UE may then determine the QoS resistance to be used in LCP procedure by subtracting from the QoS resistance used by LCP in the previous transmitter in the transmission chain the QoS resistance allocation to one hop e.g., the hop between this intermediary IAB node and the preceding transmitter. For example, if QoS resistance is only expressed in terms of number of hops, as the L2 SDU travels one hop, the remaining QoS resistance associated with the L2 SDU is decreased by one. As another example, if QoS resistance is only expressed in terms of latency, as the L2 SDU travels one hop, the remaining QoS resistance associated with the L2 SDU is decreased by the latency associated with the hop between this intermediary IAB node and the preceding transmitter in the transmission chain.

Similarly, at the reception of an L2 PDU, a transmitter, e.g., an intermediary IAB node, may determine the QoS Resistance based on one or more of the following parameters:

a) The QoS resistance budget associated with the L2 SDU when received from the preceding transmitter, e.g., in the case of uplink traffic, the immediate next hop downstream transmitter relative to this intermediary IAB node, and in the case of downlink traffic, the immediate next hop upstream transmitter;

b) Number of hops on the route between the intermediary IAB node and the IAB-donor in the case of uplink traffic, or between the intermediary IAB node and the UE in the case of downlink traffic. RRC may be configured into an IAB node, route information including the number of hops on a route;

c) Speed, e.g., the data rate of the path between the intermediary IAB node and the IAB-donor in the case of uplink traffic, or between the intermediary IAB node and the UE in the case of downlink traffic. The speed may be an estimate of the data rate in kilobits per second, on the data path between the UE and the IAB donor node or the gNB. This is the minimum speed of all hops' speeds on the path; RRC may be configured into an IAB node, uplink speed information of a route or information that an IAB node may use to determine uplink speed. Such information may be broadcast by a parent IAB node to child IAB nodes;

d) Load of the path between the intermediary IAB node and the IAB-donor in the case of uplink traffic, or between the intermediary IAB node and the UE in the case of downlink traffic, where the load may represent an estimate of the current percentage loading of the data path. This may be defined relative to the hop with the maximum loading factor e.g., the load of the hop with the maximum loading factor among all hops of the path, where loading factor may be defined as the percentage of the loading relative to the capacity; RRC may be configured into an IAB node, load information of a route or information that an IAB node may use to determine load on a route. Such information may be broadcast by a parent IAB node to child IAB nodes.

e) Latency of the data path between the intermediary IAB node and the IAB-donor in the case of uplink traffic, or between the intermediary IAB node and the UE in the case of downlink traffic. The latency may be an estimate of the overall uplink latency over the data path taking into account the hop by hop latency for each hop along the data path between the UE and the IAB node or the gNB;

f) Error rate for e.g., an estimation of the expected block error rate on the path between the intermediary IAB node and the IAB-donor in the case of uplink traffic, or between the intermediary IAB node and the UE in the case of downlink traffic;

g) The timestamp associated with the L2 SDU when received from the preceding transmitter; and h) A composite metric that may include the latency, the load, the speed, the number of hops, etc.

Here, to determine a QoS budget to be used by LCP at an intermediary IAB node, the intermediary IAB node determines QoS resistance of the path between the intermediary IAB node and the final destination using one or more of the parameters above, and then subtracts this determined QoS resistance from the received QoS budget.

Enhancement to BSR

Buffer Status Report (BSR) operations may be enhanced to provide to the scheduler, for each Logical Channel Group (LCG), buffer status information for data flows of the LCG with the same QoS resistance. Such buffer status information may be provided for each QoS resistance value. RRC may configure the UE with the resistance values of the data flows that can be mapped to each logical channel. Such configuration may be performed per logical channel.

The MT part of an IAB may report regular BSRs to the parent IAB without waiting for the data that triggers the regular BSR to become available at the DU part or the MT part of the IAB node. A parent IAB node may send a grant to a child IAB node even before the child IAB node receives the data that triggers the reporting of the BSR to the parent IAB node. To achieve such operations, the following triggers may be provided for BSR reporting in a multi-hop IAB architecture.

A BSR may be triggered when a regular BSR is received by the DU part of an IAB and at least one logical channel for an LCG for which BSR is reported to the DU has a higher priority than the priority of any logical channel containing available UL data which belong to any LCG for which data is already available at the MT part of the IAB node, or for which BSR has been triggered at the MT part of the IAB node and not cancelled.

A BSR may be triggered when a regular BSR is received by the DU part of an IAB and none of the logical channels which belong to an LCG contains any available UL data at the MT part of the IAB node.

A BSR may be triggered when the MAC entity of the DU part of the IAB has new UL data available for a logical channel which belongs to an LCG the new UL data belongs to a logical channel with higher priority than the priority of any logical channel containing at the MT part of the IAB node available UL data which belong to any LCG or for which BSR has been triggered at the MT part of the IAB node and not cancelled.

A BSR may be triggered when the MAC entity of the DU part of the IAB has new UL data available for a logical channel which belongs to an LCG none of the logical channels which belong to an LCG contains any available UL data at the MT or the IAB node.

Enhanced NR Data Link Architecture Based Solution to QoS Realization

Data link architectures may be enhanced to facilitate QoS realization, e.g., using various QoS mapping architectures. For example, data flows of the same QoS (e.g., data mapped to the same QoS Flow) that have different QoS resistances may be mapped to different DRBs. In this example, data flows of the same QoS but with higher QoS resistance may be mapped to DRB mapped to higher priority logical channel than data flows of the same QoS but with lower QoS resistance. In the case of UE (or IAB donor), the mapping may be done in the Service Data Adaptation Protocol (SDAP) entity. Alternatively, the mapping may be done in PDCP, or the differentiation of data flow of the same QoS flow but different QoS resistance taking into account QoS resistance in scheduling and data forwarding treatment, may be done in the adaption layer, for example, in the case of IAB nodes.

For instance, the adaptation layer may aggregate same QoS DRBs of UEs served by the IAB node to different IAB DRBs taking into account the QoS resistance associated with the data paths of the data flows of the various UE DRBs. For example, for UE DRBs with the same QoS, the adaption layer may map among these UE DRBs, where the ones carrying data flows of higher QoS resistance to IAB DRB of higher QoS than required by the corresponding data flows, while the ones carrying data flows of lower QoS resistance may be mapped to IAB DRBs of lower QoS as long as these IAB DRBs QoS meet the QoS requirements of the corresponding data flows.

An RLC instance may be configured per Radio Bearer (RB) and QoS resistance. Thereby, each RB may be configured with as many RLC instances as the number of different QoS resistances associated with the RB. Within the RB, data flows of higher QoS resistance may be mapped to a RLC instance associated with a logical channel with higher priority than the priority of the logical channel the RB would have been mapped if no consideration is given to QoS Resistance.

Sub-DRBs (respectively sub-SRBs) per DRB may be introduced, where data flows with common QoS but different QoS Resistance are mapped to different sub-DRBs within a DRB. This may be viewed as replication of DRBs, wherein each DRB is replicated into as many DRBs as there are different QoS resistances associated with the data mapped to the DRB. Further, a DRB may be replicated into multiple Sub-DRBs as required by the number of distinct QoS resistance values configured to the data flows mapped to the DRB. Each of these replicated DRBs or sub-DRBs may then be mapped to an RLC instance which is then mapped each, to a one logical channel.

SDAP, PDCP, or RLC may keep separate buffers for data flows with same QoS but different QoS resistances. For example, in the UE, IAB donor, gNB, SDAP, PDCP, or RLC may keep separate buffers for data flows with same QoS but different QoS resistances. Similarly, in IAB nodes, RLC may be keep separate buffers for data flows with same QoS but different QoS resistances.

Route Selection

Triggers for Route Selection and Reselection

Example triggers may be considered for route selection and re-selection:
- data becoming available for transmission or for retransmission;
- BWP, carrier, or cell selection or reselection;
- BWP or carrier selection and reconfiguration;
- radio link failure
- SCG addition, release, or modification;
- activated triggers for handover;
- a change in service subscription;
- a change in QoS requirements (e.g., with radio bearers reconfiguration);
- a change in load condition or change in QoS resistances associated with the existing route; and
- a change in network topology.

Who Performs Route Selection and Reselection

A UE or an MT function of an IAB node may perform uplink route selection. RRC may configure the UE or the MT function to perform route selection, for example. For example, for transmission with a configured grant, the UE may perform uplink route selection. Route selection may consist of selecting the next hop, selecting a multi-hop route, or selecting a complete route between the transmitter and the destination.

An IAB donor or an IAB node (e.g., a gNB or a DU function of an IAB node) may perform downlink route selection. RRC and NG-C AP and F1-AP may configure the IAB node to perform route selection, for example.

The network may broadcast assistance information to help the UE perform the route selection. For example, a UE may use the assistance information in the decision of route selection. The assistance information may comprise one or more QoS budget attributes which characterize the path between the UE and the IAB donor node or the gNB, which may be expressed together as a QoS resistance. The QoS attributes that may be in a QoS budget or resistance include, for example, a number of hops, an uplink speed, an uplink load, a latency, a battery level, and an error rate.

An uplink speed may be, for example, the data rate of the path between the UE and the IAB donor node or the gNB. The speed may be an estimate of the data rate in kilobits per second, on the data path between the UE and the IAB donor node or the gNB.

The uplink load of the path, may be, for example, an estimate of the current percentage loading of the data path.

The latency of the data path may be an estimate of the overall uplink latency over the data path taking into account the hop by hop latency for each hop along the data path between the UE and the IAB node or the gNB, The QoS attributes may take into account a UE battery level, power consumption, or other capability.

The error rate may be, e.g., an estimation of the block error rate experienced on the path.

Enhancement to Scheduling Request (SR)

In the current NR specification, each SR configuration corresponds to one or more logical channels. Each logical channel may be mapped to zero or one SR configuration, which is configured by RRC. The SR configuration of the logical channel that triggered the BSR (if such a configuration exists) is considered as the corresponding SR configuration for the triggered SR.

To take into account the fact that data mapped to the same logical channel may travel through different routes to destination and experience different QoS attributes, such as differing numbers of hops, each logical channel may be enhanced via mapping to one or more SR configurations, which may be configured by RRC. For example, an SR triggered by data of the same logical channel scheduled on routes with different QoS resistances for may be assigned different SR configurations.

Each logical channel may be configured with several data buffers, where data flows with the same QoS resistance, or data with same QoS flow and same QoS resistance within the logical channel, are assigned to the same data buffer, while data flows with different QoS resistance within the same logical channel, or data with same QoS flow but different QoS resistance within the same logical channel, may be assigned to different data buffers. A logical channel may be configured with more than one SR configuration where each data buffer of the same QoS resistance within a logical channel is assigned zero or one SR configuration, which is configured by RRC. RRC may prioritize a data mapped to a route with a higher QoS for SR by configuration into MAC, a higher priority SR configuration for that data. As the data travelled through the IAB nodes, the corresponding allowed QoS resistance budget is adjusted accordingly as described above in the section titled "Allowed QoS Resistance Budget Determination at Intermediary IAB Nodes." As the allowed QoS resistance budget is adjusted, the SR configuration for the data is adjusted as well. A logical channel may be configured with one or more SR Configurations, where each SR configuration is mapped to two or more QoS resistance values. When an SR is triggered, the SR resource configuration for the transmission of the SR is selected based on the allowed QoS resistance budget of the data.

The MT part of an IAB may trigger an SR to the parent IAB, without waiting for the data that triggers the SR to become available at the DU part or the MT part of the IAB node. A parent IAB node may send a grant to a child IAB node even before the child IAB node receives the data that triggers the reporting of the SR to the parent IAB node.

In addition to traditional addition triggers, SR may also be triggered in a multi-hop IAB architecture in the following ways An SR may be triggered if an SR is received by the DU part of an IAB and there is no UL-SCH resource available at the MT part of the IAB for a new transmission.

An SR may be triggered if an SR is received by the DU part of an IAB and the UL-SCH resources available for a new transmission at the MT part of the IAB do not meet the LCP mapping restrictions configured for the logical channel(s) or configured for the specific data buffers for the logical channel that triggered the SR; note that based on the configuration of the received SR, the IAB knows the logical channel(s) that triggers the SR.

An SR may be triggered if a BSR is received by the DU part of an IAB and there is no UL-SCH resource available at the MT part of the IAB for a new transmission.

An SR may be triggered if a BSR is received by the DU part of an IAB and the UL-SCH resources available for a new transmission at the MT part of the IAB node do not meet the LCP mapping restrictions configured for the logical channel(s) or configured for the specific data buffers for the logical channel that triggered the SR.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A second apparatus, comprising a processor, a memory, and communication circuitry, the second apparatus being connected to a network via the communication circuitry, the network including a first apparatus, the second apparatus, a third apparatus and a fourth apparatus, the second apparatus further comprising computer-executable instructions stored in the memory which, when executed by the processor, cause the second apparatus to perform operations comprising:
receiving routing information from the fourth apparatus, wherein the routing information comprises attributes for quality of service (QoS) for one or more hops among a plurality of integrated access and backhaul (IAB) nodes:
receiving a first packet from the first apparatus, the first packet comprising a first buffer status report (BSR) of the first apparatus:
generating a second packet comprising a second BSR of the second apparatus in response to receiving the first BSR without waiting for a reception of data indicated by the first BSR;
selecting a route for a second packet to the third apparatus in accordance with the routing information;
scheduling a transmission of a second packet based on the selected route; and
sending the second packet to the third apparatus according to the scheduled transmission, the second packet comprising the second BSR.

2. The second apparatus of claim 1, wherein the operations further comprise sending the second BSR to the third apparatus without waiting for the reception of the data indicated by the first BSR.

3. The second apparatus of claim 1, wherein the operations further comprise sending a scheduling request (SR) to the third apparatus without waiting for the reception of the data indicated by the first BSR.

4. The second apparatus of claim 1 wherein the operations further including sending a scheduling request, request (SR) to the third apparatus in response to receiving the first BSR.

5. The second apparatus of claim 1, wherein the operations further include sending a first grant to the first apparatus in response to receiving the first BSR from the first apparatus, and sending the second BSR to the third apparatus after sending the first grant without waiting for the reception of the data indicated by the first BSR.

6. The second apparatus of claim 1, wherein the first packet comprises an indication of a first remaining QOS budget, the first remaining QoS budget pertaining to transmission of a content of the first packet to a destination apparatus of the content of the first packet, and the operations further include:
scheduling the transmission of the second packet based at least in part on the routing information and the first remaining QoS budget;
computing a second remaining QoS budget based at least in part upon information pertaining to a link to the third apparatus; and
sending the second packet to third apparatus, the second packet comprising at least part of the content of the first packet and the second remaining QoS budget.

7. The second apparatus of claim 6, wherein:
the first packet further comprises a first timestamp, the first timestamp pertaining to a time of sending the first packet by the first apparatus;
the operations further include scheduling the transmission of the second packet based at least in part on the selected route and the first timestamp; and
the second packet further comprises a second timestamp, the second timestamp pertaining to a time of sending the second packet.

8. The second apparatus of claim 6, wherein the first remaining QoS budget comprises a first QoS resistance, the first QoS resistance being a composite metric that is derived from multiple factors pertaining to the transmission path to the destination apparatus.

9. The second apparatus of claim 8, wherein the multiple QoS factors comprise two or more of a latency, a load condition, a number of hops, a speed, and a packet error rate.

10. The second apparatus of claim 6, wherein the operations further include:
receiving the first packet via an inbound bearer or backhaul radio link control (RLC) channel;
maintaining a buffer for each of multiple outbound bearers or backhaul RLC channels;
selecting a buffer of one of the multiple outbound bearers or backhaul RLC channels based at least in part upon the first remaining QoS budget and a QoS characteristic of the outbound bearer or backhaul RLC channel associated with the selected buffer; and
sending the second packet using the selected buffer.

11. The second apparatus of claim 6, wherein the routing information comprises a second QoS resistance, the second QoS resistance pertaining to a candidate path for the second packet to the third apparatus.

12. The second apparatus of claim 6, wherein the operations further include:
receiving route selection assistance information from the third apparatus; and
selecting the route toward the destination apparatus based at least in part on the routing information and the route select assistance information.

13. The second apparatus of claim 12, wherein the route selection assistance information comprises a second QoS resistance, the second QoS resistance pertaining to a candidate path for the second packet to the third apparatus.

14. The second apparatus of claim 6, wherein the operations further including maintaining plural scheduling request, (SR) configurations for a logical channel, the plural SR configurations corresponding respectively to plural QoS budgets.

15. A communication method performed by a second apparatus, comprising a. processor, a memory, and communication circuitry, the second apparatus being connected to a network via the communication circuitry, the network including a first apparatus, the second apparatus, a third apparatus and a fourth apparatus, the method comprising:

receiving routing information from the fourth apparatus,
wherein the routing information comprises attributes for quality of service (QoS) for one or more hops among a plurality of integrated access and bkkhaul (IAB) nodes;
receiving a first packet from the first apparatus, the first packet comprising a first buffer status report (BSR) of the first apparatus;
generating a second packet comprising a second BSR of the second apparatus in response to receiving the first BSR without waiting for a reception of data indicated by the first BSR;
selecting a route for a second packet to the third apparatus in accordance swi the routing information;
scheduling a transnnission of a second packet based on the selected route; and
sending the second packet to the third apparatus according to the scheduled transmission, the second packet comprising the second BSR.

\* \* \* \* \*